Patented June 6, 1939

2,160,841

UNITED STATES PATENT OFFICE 2,160,841

THERMAL DEHYDRATION OF ALIPHATIC ACIDS

Henry Dreyfus, London, England

No Drawing. Application July 9, 1937, Serial No. 152,761. In Great Britain July 17, 1936

7 Claims. (Cl. 260—547)

This invention relates to improvements in the thermal dehydration of aliphatic acids, and is more particularly concerned with the manufacture of acetic anhydride or ketene by the thermal dehydration of acetic acid.

The general method of manufacturing acetic anhydride or ketene directly from acetic acid is to subject the acetic acid to thermal decomposition or dehydration, usually in the presence of suitable catalysts. While dehydration takes place over a wide range of temperature, the most useful range is generally 500–1000° C. and especially 600–900° C., though of course the optimum temperature naturally depends upon the particular conditions employed and notably the particular catalyst and the pressure or partial pressure of the acetic acid. In U. S. Patent No. 1,735,962 I have described catalysing the reaction by means of a phosphoric acid and have further indicated that the process may be carried out under reduced pressure or at ordinary pressure. Further in U. S. Patent No. 1,883,353 I have shown the advantages of carrying out the process in the presence of bases, and in particular ammonia and the organic bases which are substitution products of ammonia, for example pyridine, piperidine, aniline, alkyl anilines, toluidines and the like. Again in this patent it is indicated that while the reaction may be carried out at pressures higher than atmospheric, it is preferable to employ atmospheric pressure or reduced pressure.

I have now found that the thermal dehydration of acetic acid and similar aliphatic acids may very advantageously be carried out in the presence of completely amidated oxygen acids of phosphorus. Catalysing the reaction by means of partially amidated oxygen acids of phosphorus or by means of esters thereof forms the subject matter of U. S. application S. No. 152,762, filed July 9, 1937, corresponding to British application No. 19,859/36, filed July 17, 1936. The compounds to be used according to the present invention may, for example, be the completely amidated phosphorous and phosphoric acids. Thus the compounds to be used in accordance with the present invention may have the general formula

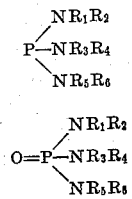

where $R_1$, $R_2$, $R_3$, $R_4$, $R_5$ and $R_6$ represent hydrogen or organic radicals which may, for example, be aliphatic, aromatic or hydro-aromatic. Further, it is to be understood that $R_1R_2$ or $R_3R_4$ or $R_5R_6$ may jointly represent an alkylene residue, so that the amide grouping is, for example, the residue of piperidine. I prefer to employ the completely amidated phosphoric acids and, moreover, to employ compounds which are of relatively high boiling point.

As suitable compounds for use according to the present invention I may mention, among the amidated phosphoric acids, phosphoric acid tris-propylamide, tris-isobutylamide, tris-diethylamide, tris-anilide, tris-paratoluidide, tris-paraphenetidide, tris-asymmetric-ortho-xylidide, tris-benzylamide, tris-parachloranilide, tris-monomethylanilide, tris-piperidide, or mixed derivatives such as the diethylamide-bis-anilide, di-isopropylamide-bis-paratoluidide, piperidide-bis-paratoluidide, bis-piperidide-anilide and the like, and, among the amides of phosphorous acid, the tris-diethylamide, tris-di-isopropylamide, tris-piperidide, and di-isobutylamide-bis-piperidide.

The catalysts of the invention may, if desired, be used together with nitrogenous bases, including ammonia and the organic nitrogenous bases, as referred to in U. S. Patent No. 1,883,353. The amides may be dissolved in the main bulk of the acetic acid to be subjected to thermal dehydration, or they may be injected into the reaction chamber separately from the acid to be dehydrated, or separately from the main bulk of the acid. Most conveniently the acid is vaporised, preheated and fed to the reaction chamber and the catalyst is introduced into the superheated acid vapor in the form of a solution in a solvent which exercises no deleterious effect upon the reaction. Preferably the catalyst is dissolved in a portion of the acetic acid or other acid to be dehydrated but other solvents may be used, for instance there may be used for this purpose a quantity of a liquid which is subsequently to be employed to facilitate the separation of the products of the thermal dehydration, as, for example, by forming an azeotropic mixture with water as referred to below. It is preferred to raise the temperature of the acid vapor by the preheating step to within 20 to 70° C. of the temperature at which the thermal dehydration is to be effected, for instance when employing temperatures of 670–720° C. in the reaction zone the preheater may be run at 600–650° C. If desired, however, the vapor may only be heated to within say 100°

C. of the dehydration temperature or may be heated right up to the dehydration temperature.

The quantity of amide to be employed may be quite small in relation to the amount of acetic acid or other acid vapor. For example, it may be of the order of 5% of the weight of the acetic acid, but is preferably much less, say less than 1%, quantities of the order of .2 to .5% being quite sufficient. Where a nitrogenous base is employed in conjunction with the amide, its proportion may be similar to that of the amide. The nitrogenous base may be introduced together with the amide or separately.

The reaction is best carried out at atmospheric pressure or reduced pressure. As already indicated, the main products of the thermal dehydration of acetic acid are acetic anhydride and ketene. The anhydride or ketene may be recovered from the reaction products in any suitable manner. For example the reaction products may be cooled so as to condense the whole of the anhydride, water and unchanged acid and the ketene allowed to pass on, or the reaction products may be subjected to a fractionation treatment designed to separate the anhydride from the water and the ketene. In the latter case, it is of advantage to employ liquids such as benzene, toluene, xylene, chlorbenzene, chloroform and the like which form an azeotropic mixture with the water.

The invention is particularly useful in the thermal dehydration of acetic acid to acetic anhydride and/or ketene, but it may also be applied to the thermal dehydration of other aliphatic acids, for example propionic acid, butyric acid and the like.

Having described my invention, what I desire to secure by Letters Patent is:

1. Process for the thermal dehydration of an aliphatic acid, which comprises subjecting the vapor of the aliphatic acid to the action of heat in the presence of a completely amidated oxygen acid of phosphorus.

2. Process for the thermal dehydration of an aliphatic acid, which comprises subjecting the vapor of the aliphatic acid to the action of heat in the presence of a completely amidated phosphoric acid.

3. Process according to claim 1, wherein the acid vapor is preheated to above its critical temperature and thereafter the superheated acid vapor is passed into a reaction zone in which the thermal dehydration takes place and said amidated acid is introduced into the superheated acid vapor in the form of a solution.

4. Process for the thermal dehydration of acetic acid, which comprises subjecting acetic acid vapor to the action of heat in the presence of a completely amidated oxygen acid of phosporus.

5. Process for the thermal dehydration of acetic acid, which comprises subjecting acetic acid vapor to the action of heat in the presence of a completely amidated phosphoric acid.

6. Process according to claim 4, wherein the acid vapor is preheated to above its critical temperature and thereafter the superheated acid vapor is passed into a reaction zone in which the thermal dehydration takes place and said amidated acid is introduced into the superheated acid vapor in the form of a solution.

7. Process according to claim 5, wherein the acid vapor is subjected to preheating and thereafter the superheated acid vapor is passed into a reaction zone in which the thermal dehydration takes place and said amidated acid is introduced into the superheated acid vapor in the form of a solution in acetic acid.

HENRY DREYFUS.